B. H. DIVINE.
MECHANISM FOR CONSTRUCTING A WHEEL.
APPLICATION FILED MAY 20, 1912.

1,192,875.

Patented Aug. 1, 1916.
2 SHEETS—SHEET 1.

WITNESSES:
L. W. Snyder
E. T. DeGiorgi

INVENTOR
BRADFORD H. DIVINE
BY Henry M. Love
ATTORNEY

UNITED STATES PATENT OFFICE.

BRADFORD H. DIVINE, OF UTICA, NEW YORK, ASSIGNOR TO DIVINE BROTHERS COMPANY, OF UTICA, NEW YORK, A CORPORATION OF NEW YORK.

MECHANISM FOR CONSTRUCTING A WHEEL.

1,192,875.   Specification of Letters Patent.   Patented Aug. 1, 1916.

Application filed May 20, 1912. Serial No. 698,399.

*To all whom it may concern:*

Be it known that I, BRADFORD H. DIVINE, a citizen of the United States, residing at Utica, in the county of Oneida and State of New York, have invented certain new and useful Improvements in Mechanism for Constructing a Wheel, of which the following is a specification, reference being had therein to the accompanying drawing, this case being in part a continuation of my application for patent for improvements in wheels, filed August 29, 1910, Serial No. 579,491.

My invention relates to the construction of a wheel and consists in the mechanism hereinafter pointed out and claimed.

An object of the invention is to provide a truck wheel, as a complete unit, embodying a ring composed of transversely-arranged layers of woven fabric circumferentially and radially compressed into a compact mass, and to utilize the permanently united body-forming and hub-supporting members of the wheel, to constitute a permanent binder, for and maintaining said mass in its connected condition to form a permanent tire.

A further object of my invention is to form a wheel having a central hub with a circumferential flange on the hub and providing a pair of metal disks which are secured to the circumferential flange on the hub and so constructed as to engage and support the entire inner diameter of a tire composed of a plurality of sections of woven fabric radially and circumferentially compressed and the tire shaped on its opposing faces so that the disks may engage the opposing edges of the tire and at the same time furnishing a permanent seat centrally located for the entire internal diameter of the tire.

Figure 1:
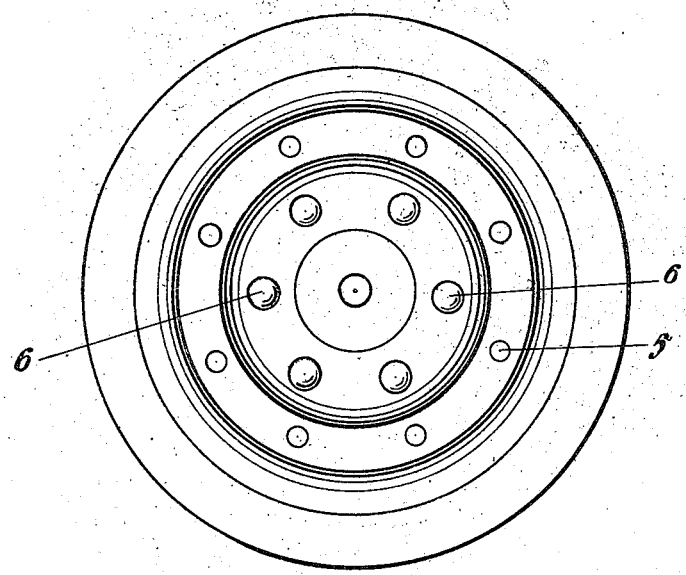
Figure 2:
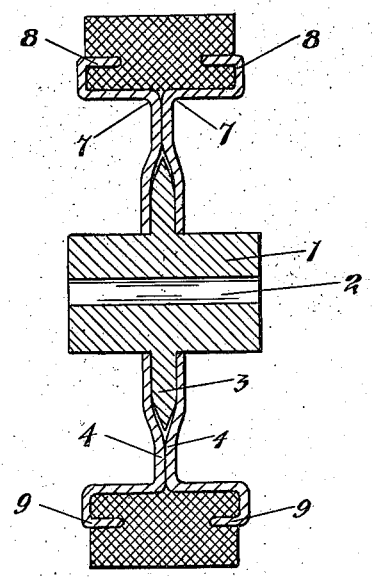
Figure 1A:
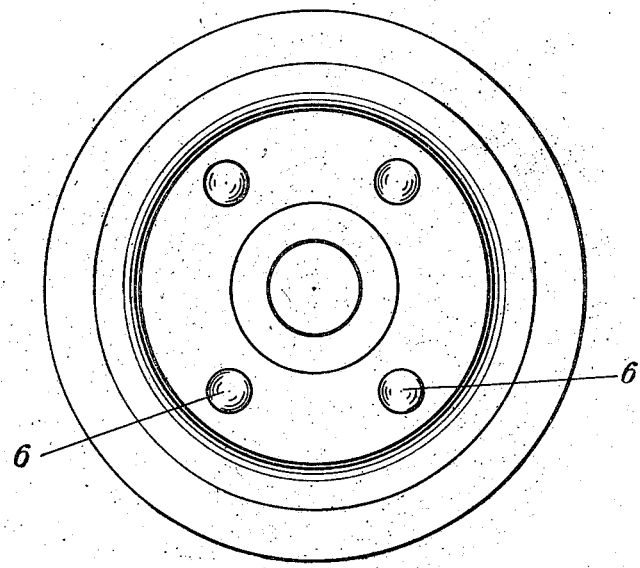
Figure 2B:
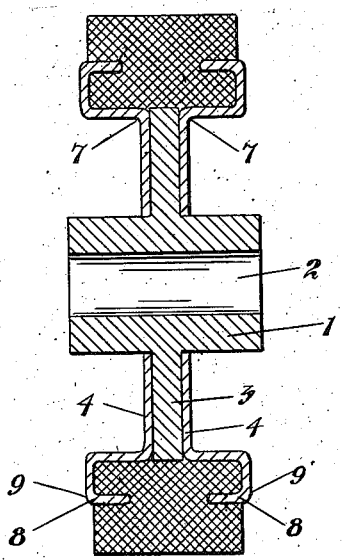

In the drawings Figure 1 shows a front view of my wheel; Fig. 2 represents a vertical cross section of the wheel; Fig. 1<sup>A</sup> represents a wheel of smaller diameter, and Fig. 2<sup>B</sup> represents a vertical cross section of the same.

Having described my invention in reference to the figures illustrating the same, I will now proceed to describe the construction in detail.

I provide central hub 1 having a central bore 2 with a circumferential flange 3, and a pair of disks 4, 4, which are secured together at 5 and secured to the circumferential flange at 6, 6. The disks are formed at their outer circumferential portions 7 to fit the contour of the inner diameter of the tire and form a central support.

The tire is composed of a plurality of sections of woven fabric cut on a bias to the weave thereof, and placed side by side crosswise of the tread of the tire, and radially and circumferentially compressed into a compact mass, and provided upon its opposite faces with grooves 8, 8.

The outer annular edge portions of the disks are bent at right angles forming flanges 9, 9, to engage the grooves 8, 8, in the opposite faces of the tire. Any other mode of securing the flanges to the opposite faces of the tire can be employed without departing from the spirit of my invention. When these disks are brought together the flanges are inserted into the grooves and the disks are secured together and to the circumferential flange on the hub.

The tire is preferably formed with a cylindrical inner surface extending throughout the full length of the tire from one flat end face thereof to the other and usually parallel flat end face thereof. The grooves 8, are of a width to snugly receive the flanges 9, and open through the opposite end faces of the tire and are preferably cylindrical and of the same diameter and located approximately midway between the inner and outer surfaces of the tire. In the particular embodiments illustrated, the circular flange is formed integral with the cylindrical hub and is located about midway the length of the hub, and the two wheel-body-forming disks or plates are duplicates with center openings receiving the hub so that the center edges of the disks circumferentially fit around the hub. In the particular examples illustrated, the outer circumferential portion of each disk is bent outwardly approximately at right angles to the body portion of the disk, to form a cylindrical rim or seat 7, of approximately the same diameter as the inner diameter of the tire and in width approximately equal to one half the length of the tire, and at the outer edge of the rim 7, the disk is again bent approximately at right angles to form an annular flat radial wall to fit an end face of the tire, and at the outer edge of this wall, the disk is bent inwardly approximately at right angles to form the cylindrical flange 9, of less width than and spaced outwardly from and concentric with the rim 7.

The cylindrical rims 7, of a pair of disks are designed (either alone or in connection with the interposed flange of the hub) to form a cylindrical seat continuous throughout the full length of the inner surface of the tire and on which said surface of the tire tightly fits and which supports and backs the tire throughout its length to sustain the same against radial stresses and compression while said cylindrical rim is sustained by the radial portions of the disks, the hub flange and the inner edges of the disks that abut the hub. The tire also preferably snugly fits the inner and outer surfaces of the cylindrical flanges 9, of the disks and hence said flanges brace the outer portions of the tire against radial compression and in turn are backed and supported by the cylindrical rim 7, and the portions of the tire interposed between the rim and the inner faces of the flanges. The outer flat radial portions of the disks that fit the end faces of the tire not only hold the tire against longitudinal expansion as well as movement on the rims but also serve as protecting guards therefor and brace and support the flanges.

In the particular examples of my invention illustrated, the wheel bodies are internally closed so that each disk is braced throughout its radial length from the hub to the cylindrical rim 7, either by tightly fitting against the hub flange and the opposite disk as in Figs. 1 and 2, or by tightly fitting the hub flange, as in Figs. 1$^A$ and 2$^B$.

In Figs. 1 and 2, the radial length of the hub flange is less than the radial distance from the hub to the cylindrical rim 7, and the two disks fit the opposite faces of the hub flange and are rigidly riveted to said flange while from the edge of the hub flange to the rim 7, the disks are brought together and their inner side faces are held tightly abutting by the permanent rivets 5. In Figs. 1$^A$ and 2$^B$, the circumferential edge of the flange is cylindrical and concentric with the wheel axis and the cylindrical inner surface of the tire and forms a portion of the cylindrical rim on which the tire is seated, being interposed between and of the same diameter as the cylindrical rim portions 7, of the two disks. In this form, the disks tightly fit the hub flanges the full radial distance from the hub to the cylindrical rim and are rigidly secured thereto by permanent rivets.

In making the complete wheel unit, the compressed fibrous mass constituting the tire is compacted to the desired density in a temporary binder and after the tire has been properly shaped and the grooves have been cut in its ends, the hub and rigid body forming disks are applied thereto and permanently secured together to form the permanent binder that maintains the fibrous approximately non-elastic permanent tire in its compacted condition. The temporary binder is then removed.

I do not wish to limit all features of the invention to the particular body forming and hub members disclosed, but specifically the particular embodiments illustrated are of peculiar advantage and utility in a wheel embodying an approximately non-elastic dense compacted fibrous material tire.

Having described my invention, what I claim as new and desire to secure by Letters Patent, is:

1. As a new article of manufacture, a truck wheel or the like, consisting essentially of a ring composed of transversely arranged layers of woven fabric compressed together circumferentially into a hard compact mass and having grooves cut in its opposite side faces, in combination with a permanent binder for said ring permanently holding the same circumferentially contracted and in tire forming shape and condition, said binder consisting of a pair of opposing wheel-body forming and hub-supporting members internally supporting said ring at its inner surface and having flanges fitting said grooves, said ring being held compressed between and by said permanent members, means permanently locking said members together and to said ring, and a hub carried by said members, substantially as described.

2. As a new article of manufacture, a truck wheel or the like, consisting essentially of a ring composed of transversely-arranged layers of woven fabric circumferentially and radially compressed into a compact mass, in combination with a permanent binder maintaining said mass in its compressed contracted condition to form a permanent tire, said permanent binder consisting of wheel-body-forming and hub-supporting members, and means for rigidly locking said members in permanent position, substantially as described.

3. A truck wheel consisting essentially of a ring having a cylindrical inner surface and annular grooves in its ends and composed of transversely-arranged layers of woven fabric circumferentially and radially compressed into a compact mass, in combination with a permanent binder maintaining said mass in its compressed condition to form a permanent tire, said permanent binder forming a cylindrical rim fitting said cylindrical surface of the tire throughout its length and flanges fitting said grooves, said binder composed of a pair of similar rigid side disks, a hub extending through said disks and formed with an exterior annular flange between said disk, and means rigidly fastening said disks to said flange to form a permanent wheel body and hub, substantially as described.

4. A truck wheel consisting essentially of a ring composed of transversely-arranged fibrous material layers compressed together circumferentially into a hard compact mass and having a cylindrical inner surface, flat parallel end surfaces, and cylindrical grooves in its ends concentric with said surface; in combination with a permanent binder for said ring holding the same contracted in tire forming shape and condition and forming a cylindrical rim on which said cylindrical surface of the tire is supported throughout its full length, and annular radial walls fitting said end surfaces, and cylindrical flanges in said grooves; said permanent binder being formed by the permanent body and hub of the wheel composed of a hub provided with a circumferential flange, a pair of side disks arranged on said hub, and means fixing said disks to and against said flange, substantially as described.

5. A truck wheel consisting essentially of a ring composed of fibrous material compressed into a hard compact mass to form a permanent tire, in combination with a permanent binder holding said mass in its compacted permanent tire form and condition, said mass having cylindrical grooves in its ends and a cylindrical inner surface, said permanent binder forming cylindrical flanges fitted in said grooves and a cylindrical rim fitting and extending throughout the full length of said inner surface, said permanent binder forming the permanent body and hub of the wheel and being composed of a hub having a circumferential flange and opposite side disks between which said flange is located and to which it is riveted.

6. A truck wheel consisting of an approximately non-elastic ring of a compacted fibrous mass, in combination with a permanent binder holding and maintaining said mass compacted in permanent tire form and condition, said ring having end grooves, said permanent binder providing a rim on which the inner surface of said tire is seated throughout its length and side flanges engaging said grooves, and being formed by the body of the wheel composed of a hub having an exterior circumferential flange and a pair of opposite side disks on said hub and fitting said flange and rigidly secured thereto, each disk having a radial body portion and an out turned rim portion having a flange, each disk at its inner side face tightly fitting against and being braced by the remaining radial portion of the wheel body from the hub to the rim, substantially as described.

7. A truck wheel consisting of a solid compact permanent tire, in combination with a permanent binder therefor consisting of a hub having an exterior circumferential flange formed with a cylindrical circumferential edge fitting the inner surface of the tire midway the length thereof, a pair of similar side disks on said hub and having radial body portions parallel with and fitting the opposite side faces of said flange from the hub to the tire, said disks having flanges gripping the opposite ends of the tire and also having rim portions in continuation of said cylindrical edge of the hub flange and in connection therewith forming a rim on which the inner surface of said tire is seated throughout its length, and means rigidly securing said disks and hub flange together, substantially as described.

In testimony whereof I hereunto affix my signature in the presence of two witnesses.

BRADFORD H. DIVINE.

Witnesses:
HELEN M. McLOUGHLIN,
ELEANOR T. DE GIORGI.